(12) United States Patent
Yang

(10) Patent No.: US 12,418,843 B2
(45) Date of Patent: Sep. 16, 2025

(54) INFORMATION TRANSMISSION METHOD AND APPARATUS, AND COMMUNICATION DEVICE

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 520 days.

(21) Appl. No.: 17/779,198

(22) PCT Filed: Nov. 25, 2019

(86) PCT No.: PCT/CN2019/120731
§ 371 (c)(1),
(2) Date: May 24, 2022

(87) PCT Pub. No.: WO2021/102650
PCT Pub. Date: Jun. 3, 2021

(65) Prior Publication Data
US 2022/0400416 A1    Dec. 15, 2022

(51) Int. Cl.
H04W 36/00    (2009.01)
H04W 24/04    (2009.01)
H04W 36/08    (2009.01)
H04W 36/30    (2009.01)

(52) U.S. Cl.
CPC ....... *H04W 36/0079* (2018.08); *H04W 24/04* (2013.01); *H04W 36/0058* (2018.08); *H04W 36/0077* (2013.01); *H04W 36/0085* (2018.08); *H04W 36/08* (2013.01); *H04W 36/305* (2018.08)

(58) Field of Classification Search
CPC ............. H04W 36/0079; H04W 24/04; H04W 36/0058; H04W 36/0077; H04W 36/0085; H04W 36/08; H04W 36/305; H04W 36/0005
See application file for complete search history.

(56) References Cited

U.S. PATENT DOCUMENTS

| | | | | |
|---|---|---|---|---|
| 12,035,188 B2* | 7/2024 | Yan | ................... | H04W 36/0072 |
| 12,089,107 B2* | 9/2024 | Ishii | ................... | H04W 36/362 |
| 12,150,003 B2* | 11/2024 | Ishii | ................... | H04W 76/15 |
| 12,160,728 B2* | 12/2024 | Yan | ................... | H04W 36/0077 |
| 12,250,595 B2* | 3/2025 | Hwang | ................... | H04W 8/22 |

(Continued)

FOREIGN PATENT DOCUMENTS

| | | |
|---|---|---|
| CN | 104469873 A | 3/2015 |
| CN | 107113673 A | 8/2017 |

(Continued)

OTHER PUBLICATIONS

R2-1916276, 3GPP TSG-RAN WG2 Meeting #108, The Reporting of CHO failure, Nov. 22, 2019, CMCC, pp. 1 to 3; Type-X.

*Primary Examiner* — Brian T O Connor
(74) *Attorney, Agent, or Firm* — Volpe Koenig

(57) ABSTRACT

An information transmission method including: performing a compliance check on a cell configuration of a target cell included in a conditional handover command; when the compliance check on the cell configuration fails, at least recording a cell identifier of the target cell; and reporting failure record information including the cell identifier.

16 Claims, 5 Drawing Sheets

(56) References Cited

U.S. PATENT DOCUMENTS

| | | | |
|---|---|---|---|
| 12,256,453 B2* | 3/2025 | da Silva | H04W 36/00837 |
| 12,262,275 B2* | 3/2025 | Deenoo | H04W 76/20 |
| 2019/0223073 A1* | 7/2019 | Chen | H04W 36/0077 |
| 2020/0351734 A1* | 11/2020 | Purkayastha | H04W 36/362 |
| 2022/0322173 A1* | 10/2022 | Chang | H04W 36/305 |
| 2024/0314654 A1* | 9/2024 | Kim | H04W 36/304 |

FOREIGN PATENT DOCUMENTS

| | | |
|---|---|---|
| CN | 108243469 A | 7/2018 |
| CN | 110366212 A | 10/2019 |
| CN | 110493830 A | 11/2019 |
| WO | 2015/023067 A1 | 2/2015 |
| WO | 2018/170777 A1 | 9/2018 |

\* cited by examiner

INFORMATION TRANSMISSION METHOD AND APPARATUS, AND COMMUNICATION DEVICE

BACKGROUND

In a 4$^{th}$ Generation (4G) mobile communication technology, when user equipment (UE) performs cell handover, firstly, a network will send a handover request to a target cell to receive the handover according to a measurement result reported by the user equipment, and the target cell, after finishing acknowledgement, sends a handover command to the user equipment, and the cell configuration of the target cell is carried in the handover command. The user equipment, after receiving the handover command, launches a random access process to the target cell.

SUMMARY

The present disclosure relates to but is not limited to the technical field of wireless communication, in particular to an information transmission method and apparatus, and a communication device.

According to a first aspect of an example of the present disclosure, an information transmission method is provided and includes:
performing a compliance check on a cell configuration of a target cell included in a conditional handover command;
when the compliance check on the cell configuration fails, at least recording a cell identifier of the target cell; and
reporting failure record information including the cell identifier.

According to a second aspect of an example of the present disclosure, an information receiving method is provided and includes:
receiving failure record information reported by user equipment; and
determining a target cell to which a record content in the failure record information belongs according to a cell identifier included in the failure record information, where
the failure record information is recorded when the user equipment performs a compliance check on the cell configuration included in the conditional handover command and the compliance check on the cell configuration fails.

According to a third aspect of an example of the present disclosure, a communication device is provided and includes a processor, a memory and an executable program stored in the memory and capable of being run by the processor, where the processor, when running the executable program, executes steps of the information transmission method in the first aspect.

According to a fourth aspect of an example of the present disclosure, a communication device is provided and includes a processor, a memory and an executable program stored in the memory and capable of being run by the processor, where the processor, when running the executable program, executes steps of the information receiving method in the second aspect.

It should be understood that the above general description and the following detailed description are only illustrative and explanatory instead of limiting the examples of the present disclosure.

BRIEF DESCRIPTION OF THE DRAWINGS

Accompanying drawings here, which are incorporated in and constitute a part of the specification, illustrate examples consistent with the present disclosure and, together with the specification, serve to explain principles of the examples of the present disclosure.

DETAILED DESCRIPTION

Figure 1:
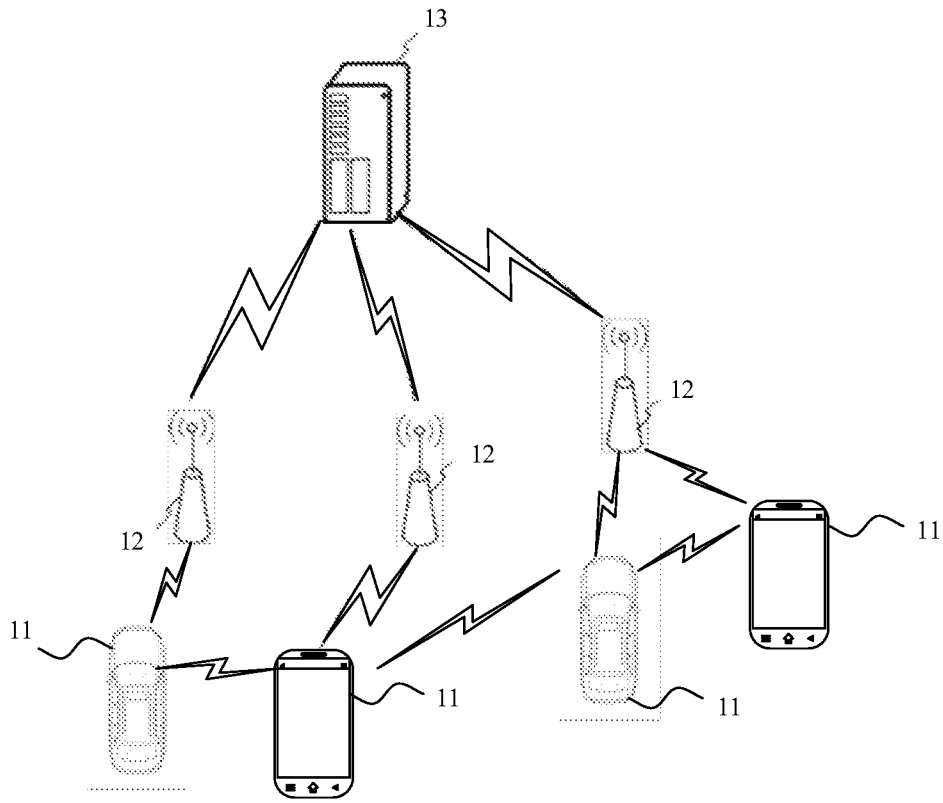
FIG. 1 is a schematic structural diagram of a wireless communication system shown according to an example.

The examples will be described in detail here and are shown in the drawings. Unless otherwise indicated, when the following description refers to the drawings, the same number in the different drawings represents the same or similar element. Implementations described in the following examples do not represent all implementations consistent with the examples of the present disclosure. Rather, they are only examples of an apparatus and method consistent with some aspects of the examples of the present disclosure as detailed in appended claims.

Terms used in the examples of the present disclosure are only intended to describe specific examples instead of limiting the examples of the present disclosure. The singular such as "a/an" and "the" used in the examples of the present disclosure and appended claims intends to include a plural form unless other meanings are clearly indicated in context. It should be further understood that a term "and/or" used herein refers to and contains any one or all possible combinations of one or a plurality of associated listed items.

It should be understood that various information, possibly described by using terms such as first, second and third in the examples of the present disclosure, are not supposed to be limited to these terms. These terms are only used for distinguishing the same type of information. For example, without departing from the scope of the examples of the present disclosure, first information may be also called second information, and similarly, the second information may be also called the first information. Depending on the context, a word "if" used herein may be constructed as "at the time that", "when . . . " or "in response to determining".

Please refer to FIG. 1, which shows a schematic structural diagram of a wireless communication system provided by an example of the present disclosure. As shown in FIG. 1, the wireless communication system is a communication system based on a cellular mobile communication technology and may include: a plurality of terminals 11 and a plurality of base stations 12.

The terminals 11 may refer to a device providing a voice and/or data connectivity for a user. The terminals 11 may communicate with one or a plurality of core networks via a Radio Access Network (RAN). The terminals 11 may be an Internet of Things terminal, such as a sensor device, a mobile phone (or called "cell" phone) and a computer with the Internet of Things terminal, for example, may be a fixed, portable, pocket, hand-held, computer built-in or vehicle-mounted apparatus, such as a Station (STA), a subscriber unit, a subscriber station, a mobile station, a mobile, a remote station, an access point, a remote terminal, an access terminal, a user terminal, a user agent, a user device, or user equipment (UE). Or the terminals 11 may also be a device of an unmanned aerial vehicle. Or the terminals 11 may also be a vehicle-mounted device, for example, may be a trip computer with a wireless communication function, or a wireless communication device externally connected with the trip computer. Or the terminal 11 may also be a road-side infrastructure, for example, may be a street lamp, a signal lamp, or other road-side infrastructures, etc. with a wireless communication function.

The base stations 12 may be a network side device in a wireless communication system. The wireless communication system may the 4th generation (4G) mobile communication system, also called a Long Term Evolution (LTE) system; or the wireless communication system may also be a 5G system, also called a new radio (NR) system or a 5G NR system. Or the wireless communication system may also be a next generation system of the 5G system. An access network in the 5G system may be called a New Generation-Radio Access Network (NG-RAN). Or the wireless communication system may be an MTC system.

The base station 12 may be an evolution base station (eNB) adopted in a 4G system. Or the base station 12 may also be a base station (gNB) of a centralized distributed architecture in the 5G system. When the base station 12 adopts the centralized distributed architecture, the base station usually includes a central unit (CU) and at least two distributed units (DU). A protocol stack of a Packet Data Convergence Protocol (PDCP) layer, a Radio Link Control (RLC) layer and a Media Access Control (MAC) layer is arranged in the central unit, a Physical (PHY) layer protocol stack is arranged in the distributed units, and the examples of the present disclosure do not limit a specific implementation of the base station 12.

Wireless connection may be established between the base station 12 and the terminal 11 through an air interface. In different implementations, the air interface is an air interface based on a fourth generation (4G) mobile communication network technology standard, or the air interface is an air interface based on a fifth generation (5G) mobile communication network technology standard, for example, the air interface is a new radio, or the air interface may also be an air interface based on a next generation mobile communication network technology standard of 5G.

In some examples, an End to End (E2E) connection may also be established between the terminals 11, for example, scenes of Vehicle to Vehicle (V2V) communication, Vehicle to Infrastructure (V2I) communication and Vehicle to Pedestrian (V2P) communication in Vehicle to Everything (V2X) communication.

In some examples, the above wireless communication system may also include a network management device 13.

The plurality of base stations 12 are connected with the network management device 13 respectively. The network management device 13 may be a core network device in a wireless communication system, for example, the network management device 13 may be a Mobility Management Entity (MME) in an Evolved Packet Core (EPC). Or the network management device may also be other core network devices, for example, a Serving GateWay (SGW), a Public Data Network GateWay (PGW), a Policy and Charging Rules Function (PCRF) unit or a Home Subscriber Server (HSS), etc. The examples of the present disclosure do not limit an implementation form of the network management device 13.

An implementation entity involved in the examples of the present disclosure includes but is not limited to: a terminal or a base station supporting the 5G mobile communication technology.

An application scenario of the examples of the present disclosure is that in order to improve robustness of cell handover, the $5^{th}$ Generation (5G) mobile communication technology proposes a Conditional HandOver process (CHO), that is, a network may send a conditional handover command to user equipment in advance, where the conditional handover command includes a set or a plurality of sets of handover triggering conditions and cell configuration of a target cell, the handover triggering conditions are generated by a source base station, and the cell configuration of the target cell may be generated by the target cell. The user equipment judges when to perform cell handover according to the triggering conditions and establishes communication connection with the target cell according to the cell configuration of the target cell.

In the 5G mobile communication technology, when link failure occurs, the user equipment will record failure variable information, and the failure variable information includes: a serving cell before failure, a final measurement result, a target cell to be handover to, location information, C-RNTI used before failure, a cause of failure, etc.

When the link failure is caused by failure of cell handover, the cause of failure is set to be handover failure, and when the link failure is caused by radio link failure, the cause of failure is set to be the radio link failure.

The user equipment, after receiving a radio resource control (RRC) connection reconfiguration message, performs a compliance check, if the compliance check fails, the user equipment is trigged to perform RRC reestablishment, and the user equipment may record the failure variable information to be RRC connection reconfiguration failure.

The user equipment, after recovering connection with the base station, may transmit the recorded failure variable information to the base station, and the base station may further perform network optimization on the basis of the failure variable information.

In the related art, the user equipment, after receiving the condition handover command, decodes the conditional handover command and attempts to perform the compliance check on the cell configuration of the target cell. If the cell configuration of the target cell fails in the compliance check, a link failure of the user equipment may be caused. However, current failure variable information does not record cell configuration of which target cell has a compliance problem, so a problematic base station cannot be identified, and purposeful optimization cannot be realized.

Figure 2:
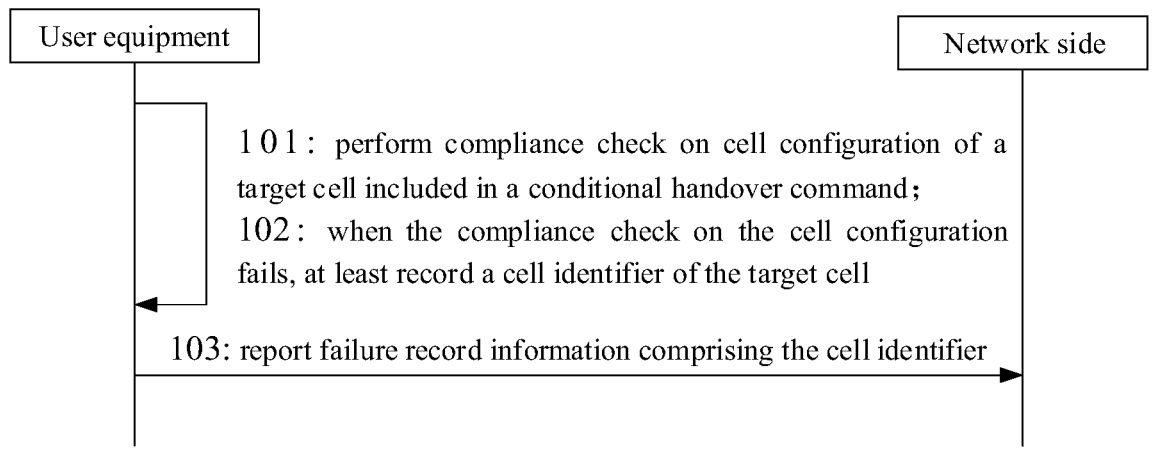
FIG. 2 is a schematic flowchart of an information transmission method shown according to an example.

As shown in FIG. 2, an example provides an information transmission method. The method is applicable to user equipment of wireless communication and includes:

step 101: a compliance check is performed on cell configuration of a target cell included in a conditional handover command;

step 102: a cell identifier of the target cell is at least recorded when the compliance check on the cell configuration fails; and step 103: failure record information including the cell identifier is reported.

In step 101, the conditional handover command may be a handover command sent to user equipment by a source base station connected with the user equipment in a Conditional cell HandOver (CHO) process. The conditional handover command may include: a cell handover triggering condition and cell configuration.

The cell handover trigger condition is a condition for triggering the user equipment to perform cell handover, for example, when the user equipment detects that a difference between link quality of a source cell and link quality of the target cell reaches a set threshold, it can be regarded as meeting the cell handover triggering condition. There may be one or a plurality of cell handover triggering conditions in the conditional handover command. The cell handover triggering condition may be configured by the source base station.

The cell configuration may be a configuration used for establishing a connection between the user equipment and the target cell, for example, the cell configuration may include: identification information of target cell, radio resource control configuration, bearer configuration, physical uplink control channel configuration, etc. The cell configuration may be configured by a base station to which the target cell belongs.

For example, the user equipment receives configurations of two cells included in the conditional handover command which are respectively:

a: cell 1, configuration of mapping dataResource Bearer (DRB) 1 and DRB2 to a logical group (LCG)1; and b: cell 2, configuration of mapping DRB1 and DRB2 to LCG1, and configuration of mapping DRB3 to LCG2.

The target cell may be a cell indicated by the source base station and capable of handover by the user equipment. There may be cell configurations of one or a plurality of target cells in the conditional handover command received by the user equipment.

In step 102, the compliance check may be a processing process that the user equipment compares its own user equipment configuration with the cell configuration of the target cell and determines whether demands of the cell configuration of the target cell may be met. For example, the user equipment may make a comparison of whether its own wireless communication resource configuration meets demands of the cell configuration of the target cell.

A situation of failure of the compliance check on the cell configuration may be that the user equipment does not have a source in the cell configuration, etc.

The cell identifier is unique and may be used for uniquely identifying a target cell. For example, the cell identifier may be a bit sequence, for example, the cell identifier may be a 28-bit sequence.

When the compliance check on the cell configuration fails, the target cell whose cell configuration fails in the compliance check may be recorded, and the recorded target cell is reported through the failure record information. The failure record information may be sent to the base station connected with the user equipment, or forwarded to a core network through the base station. The failure record information may be sent to the base station through RRC connection and may be transmitted by being carried in RRC signaling. The core network or the base station may determine the target cell whose cell configuration fails in the compliance check according to the cell identifier in the failure record information. The failure record information may be a record specific to a situation of failure of the compliance check on the cell configuration, and the core network or the base station receives the failure record information, may determine that the compliance check on the cell configuration fails, and may determine the target cell whose cell configuration fails in the compliance check according to the cell identifier in the failure record information. In this way, the target cell whose cell configuration fails in the compliance check is accurately determined through the cell identifier in the failure record information, thus during subsequent maintenance of the target cell, the pertinence of maintenance for the target cell may be improved, and maintenance efficiency is improved.

In an example, the failure record information further includes: a failure identifier. The failure identifier is configured to indicate that the compliance check on the cell configuration of the target cell fails.

The failure record information may record different causes of link failure, for example, when the link failure is caused by handover failure, the cause of failure may be recorded to be handover failure in the failure record information, and when the link failure is caused by radio link failure, the cause of failure may be recorded to be the radio link failure in the failure record information.

When the compliance check on the cell configuration fails, the cause of failure may be recorded to be the failure of the compliance check on the cell configuration in the failure record information.

The cause of failure may be recorded to be the failure of the compliance check on the cell configuration in the failure record information by recording the failure identifier. After the base station or the core network receives the failure record information, the cause of link failure of a cell may be determined according to the failure identifier.

For example, as for configurations of cell a and cell b in the above example, when the configuration of cell b, namely, cell configuration of cell 2, fails in the compliance check, a cell identifier of cell 2 and a bit sequence of a preset value may be recorded in the failure record information, where the bit sequence of the preset value may indicate that the compliance check on the cell configuration fails. In this way, the base station or the core network, after receiving the failure record information, may determine that the compliance check on the cell configuration of cell 2 fails.

In an example, before step 103, the method further includes: radio resource control (RRC) connection is reestablished, and step 103 may include: the failure record information is reported to the core network through the base station after finishing reestablishment of the RRC connection.

The failure of the compliance check on the cell configuration may trigger the user equipment to perform RRC connection reestablishment. After the RRC connection is reestablished, a cell connected with the user equipment may be the same as or different from the cell connected with the user equipment before the RRC connection is reestablished, a base station connected with the user equipment may be the same as or different from the base station connected with the user equipment before the RRC connection is reestablished.

The user equipment may report the failure record information after the RRC connection is reestablished.

In an example, determining the compliance check on the cell configuration has failed in step 101 includes:

determining the failure of the compliance check on the cell configuration when the cell configuration includes user equipment configuration which the user equipment does not have.

The user equipment configuration may be a configuration of the user's own equipment, in which case user equipment configuration information of the user's own equipment is forwarded to the target cell by the user equipment through the source base station and may include bearer configuration and/or supported frequency band information, etc. The target cell receives the user equipment configuration, distributes different resources to the user equipment configuration, and provides corresponding access information. A result of resource configuration and configuration of the access information obtained in this process is the above cell configuration. The cell configuration may include: radio resource control configuration and/or bearer configuration, etc. In a process of transmitting or processing the user equipment configuration and/or the cell configuration, a situation that the cell configuration received by the user equipment is not matched with the user equipment configuration may occur, due to influence of factors such as interference.

The failure of the compliance check on the cell configuration may be determined when the user equipment configuration does not have resource configuration or bearer configuration and the like included in the cell configuration.

In an example, determining the cell configuration including user equipment configuration which the user equipment does not have includes: determining the cell configuration including data wireless bearer configuration which the user equipment does not have.

The user equipment may have a plurality of data bearer configurations and may forward them to a target base station through the source base station. The target base station maps the plurality of data bearer configurations of the user equipment to logical channels, generates the cell configuration and sends it to a user terminal. An error may occur due to a transmission environment and other factors in a transmission process of the plurality of data bearer configurations and the cell configuration, or in a processing process of the target base station, so a situation that a data bearer configuration in the cell configuration received by the user equipment is inconsistent with an actual data bearer configuration of the user equipment may occur. Accordingly, in that case a failure of the compliance check on the cell configuration occurs.

For example, the user equipment receives configurations of two cells included in the conditional handover command which are respectively:
  a: cell 1, configuration of mapping DRB1 and DRB2 to LCG1, and
  b: cell 2, configuration of mapping DRB1 and DRB2 to LCG1, and configuration of mapping DRB3 to LCG2.

The user equipment performs the compliance check and discovers that the user equipment does not have DRB3, so it is determined that the compliance check on the cell configuration of cell 2 fails.

Figure 3:
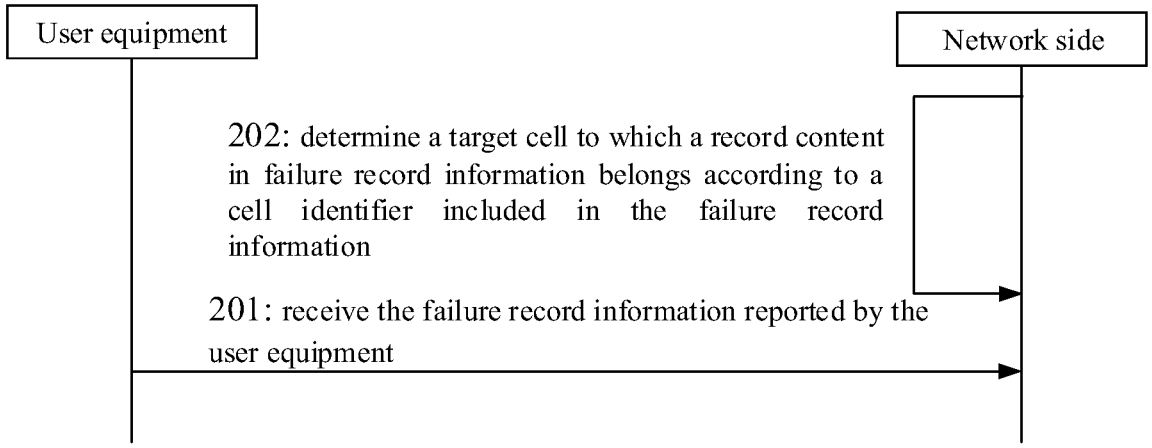
FIG. 3 is a schematic flowchart of another information receiving method shown according to an example.

As shown in FIG. 3, an example provides an information receiving method. The method is applicable to a network side of wireless communication, such as base station or a core network and includes:

step 201: failure record information reported by user equipment is received; and step 202: a target cell to which a content recorded in the failure record information belongs is determined according to a cell identifier included in the failure record information.

The failure record information is recorded when the user equipment performs a compliance check on cell configuration included in a conditional handover command and the compliance check on the cell configuration fails.

The conditioner handover command may be a handover command sent by a source base station connected with the user equipment to the user equipment in a conditional cell handover process. The conditional handover command may include: a cell handover triggering condition and cell configuration.

The cell handover trigger condition is a condition for triggering the user equipment to perform cell handover. For example, when the user equipment detects that a difference between link quality of a source cell and link quality of the target cell reaches a set threshold, that can be regarded as meeting the cell handover triggering condition. There may be one or a plurality of cell handover triggering conditions in the conditional handover command. The cell handover triggering condition may be configured by the source base station.

The cell configuration may be a configuration used for establishing a connection between the user equipment and the target cell. For example, the cell configuration may include: identification information of target cell, radio resource control configuration, bearer configuration, physical uplink control channel configuration, etc. The cell configuration may be configured by a base station to which the target cell belongs.

For example, the user equipment receives configurations of two cells included in the conditional handover command which are respectively:
  a: cell 1, configuration of mapping DRB1 and DRB2 to LCG1; and
  b: cell 2, configuration of mapping DRB1 and DRB2 to LCG1, and configuration of mapping DRB3 to LCG2.

The target cell may be a cell indicated by the source base station and capable of handover by the user equipment. There may be cell configurations of one or a plurality of target cells in the conditional handover command received by the user equipment.

The compliance check may be a processing process that the user equipment compares its own user equipment configuration with the cell configuration of the target cell, and determines whether demands of the cell configuration of the target cell may be met. For example, the user equipment may make a comparison of whether its own wireless communication resource configuration meets demands of the cell configuration of the target cell.

A situation of failure of the compliance check on the cell configuration may be that the user equipment does not have a source in the cell configuration, etc.

The cell identifier is unique to the cell and may be used for uniquely identifying a target cell. For example, the cell identifier may be a bit sequence, for example, the cell identifier may be a 28-bit sequence.

When the compliance check on the cell configuration fails, the target cell whose cell configuration fails in the compliance check may be recorded, and the recorded target cell is reported through the failure record information. The failure record information may be sent to the base station connected with the user equipment, or forwarded to a core network through the base station. The failure record information may be sent to the base station through RRC connection and may be transmitted by being carried in RRC signaling.

The core network or the base station may determine the target cell whose cell configuration fails in the compliance check according to the cell identifier in the failure record information. The failure record information may be a record specific to a situation of failure of the compliance check on the cell configuration, and the core network or the base station receives the failure record information, may determine that the compliance check on the cell configuration fails, and may determine the target cell whose cell configuration fails in the compliance check according to the cell identifier in the failure record information.

In this way, the target cell whose cell configuration fails in the compliance check is accurately determined through the cell identifier in the failure record information, thus during subsequent maintenance of the target cell, the pertinence of maintenance for the target cell may be improved, and maintenance efficiency is improved.

In an example, the method further includes:

the failure of the compliance check on the cell configuration of the target cell is determined according to a failure identifier included in the failure record information.

The failure record information may record different causes of link failure, for example, when the link failure is caused by handover failure, the cause of failure may be recorded to be handover failure in the failure record information, and when the link failure is caused by radio link failure, the cause of failure may be recorded to be the radio link failure in the failure record information. When the compliance check on the cell configuration fails, the cause of failure may be recorded to be the failure of the compliance check on the cell configuration in the failure record information.

The cause of failure may be recorded to be the failure of the compliance check on the cell configuration in the failure record information, by recording the failure identifier. After the base station or the core network receives the failure record information, the cause of link failure of a cell may be determined according to the failure identifier.

For example, as for configurations of cell a and cell b in the above example, when the configuration of cell b, namely, cell configuration of cell 2, fails in the compliance check, a cell identifier of cell 2 and a bit sequence of a preset value may be recorded in the failure record information, where the bit sequence of the preset value may indicate that the compliance check on the cell configuration fails. In this way, the base station or the core network, after receiving the failure record information, may determine that the compliance check on the cell configuration of cell 2 fails.

In an example, the method further includes: a cell configuration which fails in the compliance check is deleted from the target cell.

After the target cell is configured with the cell configuration, the cell configuration of the target cell is sent to the user equipment through the source base station of the user equipment. If the target cell does not detect access of the user equipment within predetermined time, the configured cell configuration may be deleted to save a storage resource.

In an example, receiving the failure record information reported by the user equipment includes:

the failure record information reported by the user equipment is received through radio resource control (RRC) connection.

The failure record information may be sent to the base station through the RRC connection and may be transmitted by being carried in RRC signaling.

A specific example is provided in combination with any above example.

Figure 4:
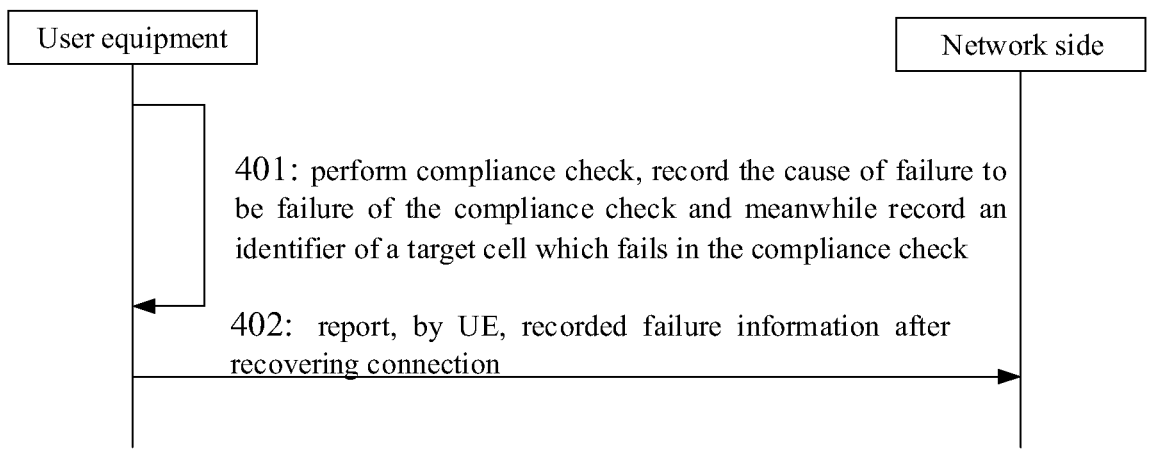
FIG. 4 is a schematic flowchart of yet another information transmission method shown according to an example.

A specific step that the user equipment performs the compliance check and reports a cell which fails in the compliance check is shown in FIG. 4 and includes:

step 401: the user equipment, after receiving the conditional handover command, performs the compliance check, when a configuration of a certain target cell fails the compliance check, the cause of the failure is recorded to be the failure of the compliance check, and meanwhile an identifier of the target cell which fails the compliance check is recorded.

For example, the user equipment receives configurations of two cells included in the conditional handover command which are respectively:

a: cell 1, configuration of mapping DRB1 and DRB2 to a LCG1; and b: cell 2, configuration of mapping DRB1 and DRB2 to LCG1, and configuration of mapping DRB3 to LCG2.

The user equipment performs the compliance check and discovers that the user equipment does not have DRB3 at present, so it is determined that the compliance check on the configuration of cell 2 fails.

The failure identifier is recorded to be the failure of the compliance check in the failure record information, and the cell identifier 2 of the target cell is recorded.

Step 402: after connection is recovered, the user equipment reports the recorded failure information, and a core network may find out a problematic base station on the basis of the failure information and may then perform detection and optimization.

Figure 5:
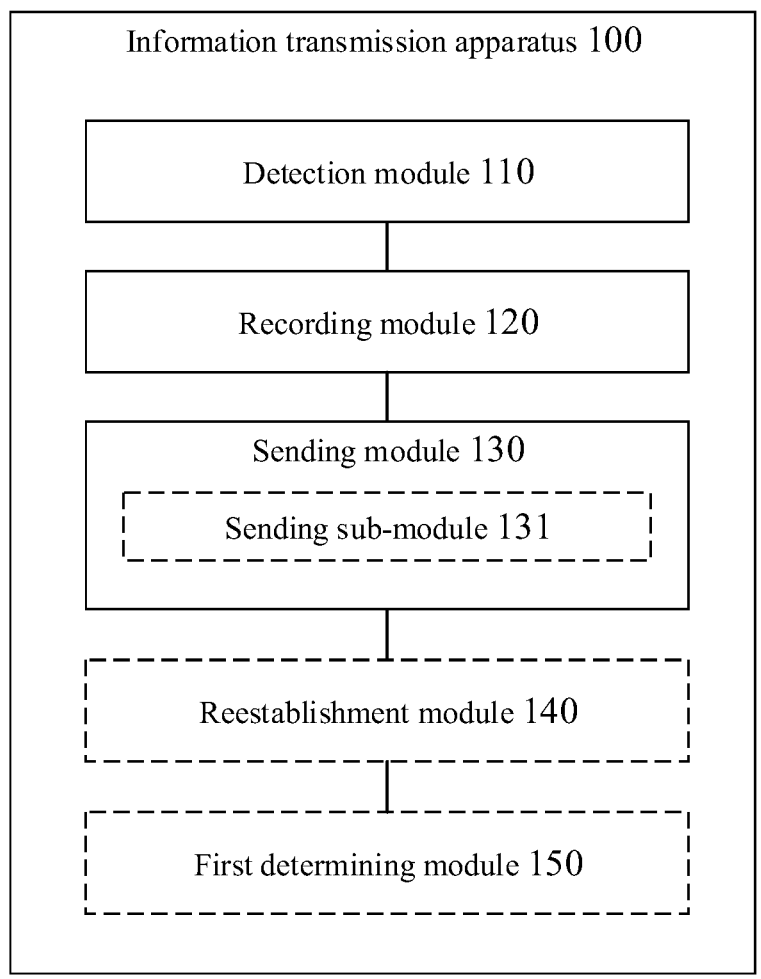
FIG. 5 is a block diagram of an information transmission apparatus shown according to an example.

An example of the present disclosure further provides an information transmission apparatus. The apparatus is applied to user equipment of a wireless communication network. FIG. 5 is a schematic diagram of a composition structure of an information transmission apparatus 100 provided by an example of the present disclosure. As shown in FIG. 5, the apparatus 100 includes: a detection module 110, a recording module 120 and a sending module 130.

The detection module 110 is configured to perform a compliance check on cell configuration of a target cell included in a conditional handover command.

The recording module 120 is configured to at least record a cell identifier of the target cell when the compliance check on the cell configuration fails.

The sending module 130 is configured to report failure record information including the cell identifier.

In an example, the failure record information further includes: a failure identifier. The failure identifier is configured to indicate that the compliance check on the cell configuration of the target cell fails.

In an example, the apparatus 100 further includes:

a reestablishment module 140, configured to perform radio resource control (RRC) reestablishment before reporting the failure record information including the cell identifier.

The sending module 130 includes:

a sending sub-module 131, configured to report the failure record information to a core network through a base station after finishing RRC connection reestablishment.

In an example, the apparatus 100 includes:

a first determining module 150, configured to determine failure of the compliance check on the cell configuration when the cell configuration includes not-having user equipment configuration.

In an example, the first determining module 150 includes:

a determining sub-module 151, configured to determine failure of the compliance check on the cell configuration when the cell configuration includes data wireless bearer configuration which the user equipment does not have.

Figure 6:
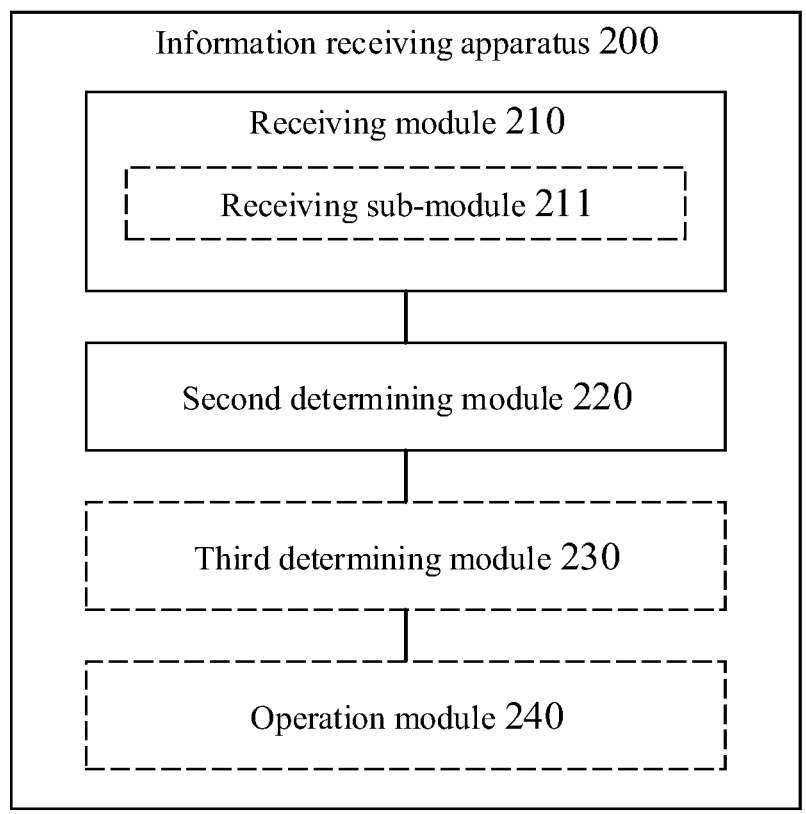
FIG. 6 is a block diagram of another information receiving apparatus shown according to an example.

An example of the present disclosure further provides an information receiving apparatus. The apparatus is applicable to a network side of wireless communication, such as a base station or a core network. FIG. 6 is a schematic diagram of a composition structure of an information receiving apparatus 200 provided by an example of the present disclosure. As shown in FIG. 6, the apparatus 200 includes: a receiving module 210 and a second determining module 220.

The receiving module 210 is configured to receive failure record information reported by user equipment.

The second determining module 220 is configured to determine a target cell to which a content recorded in the failure record information belongs according to a cell identifier included in the failure record information.

The failure record information is recorded when the user equipment performs a compliance check on cell configuration included in a conditional handover command and the compliance check on the cell configuration fails.

In an example, the apparatus 200 further includes:

a third determining module 230, configured to determine failure of the compliance check on the cell configuration of the target cell according to a failure identifier included in the failure record information.

In an example, the apparatus 200 further includes:

an operation module 240, configured to delete a cell configuration which fails the compliance check from the target cell.

In an example, the receiving module 210 includes:

a receiving sub-module 211, configured to receive the failure record information reported by the user equipment through radio resource control (RRC) connection.

In an example, the detection module 110, the recording module 120, the sending module 130, the reestablishment module 140, the first determining module 150, the receiving module 210, the second determining module 220, the third determining module 230 and the operation module 240 and the like may be realized by one or more than one Central Processing Unit (CPU), Graphics Processing Unit (GPU), Baseband Processor (BP), Application Specific Integrated Circuit (ASIC), DSP, Programmable Logic Device (PLD), Complex Programmable Logic Device (CPLD), Field-Programmable Gate Array (FPGA), general-purpose processor, controller, Micro Controller Unit (MCU), Microprocessor, or other electronic elements so as to execute the above method.

Figure 7:
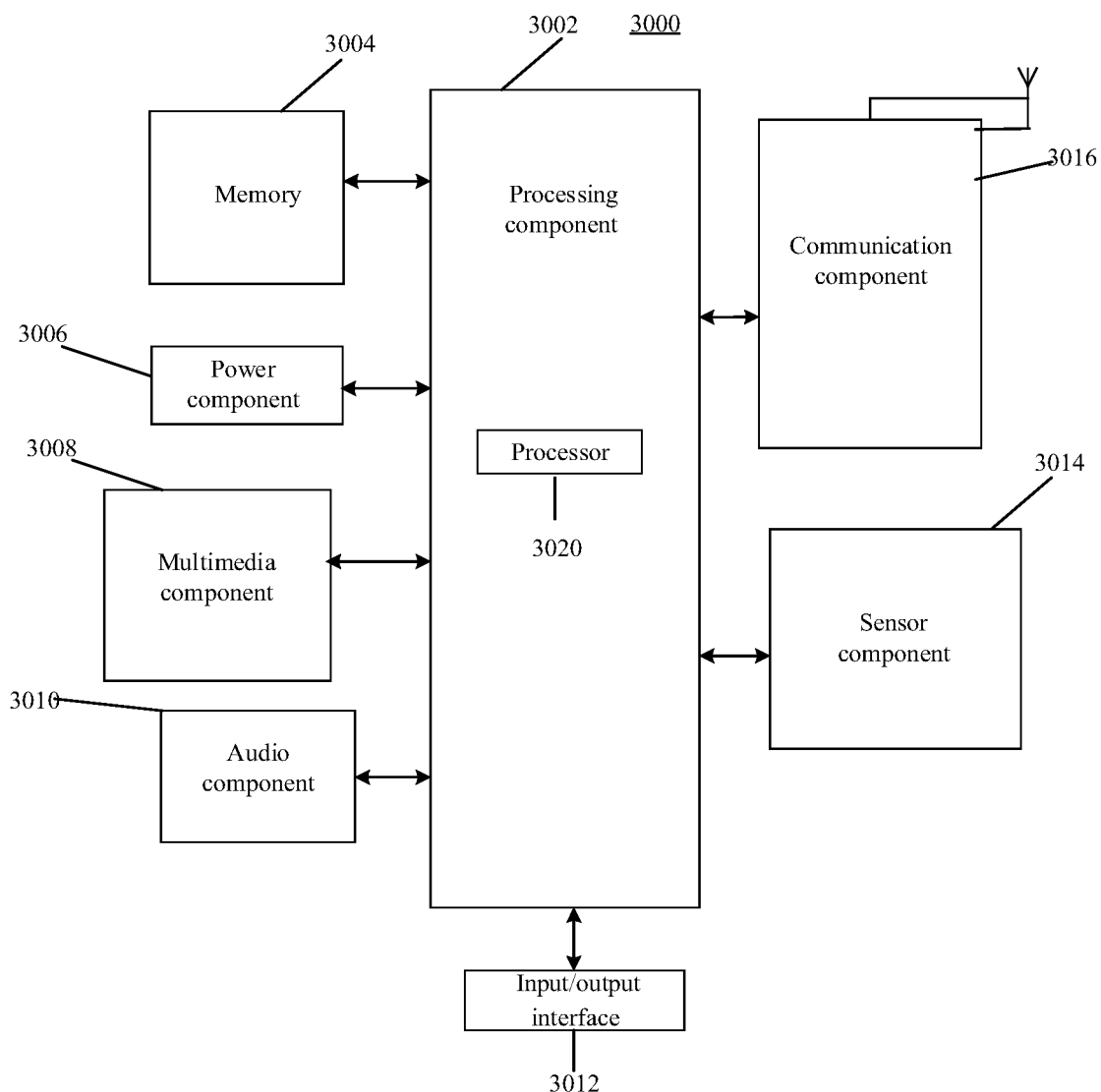
FIG. 7 is a block diagram of an apparatus configured for transmitting information shown according to an example.

FIG. 7 is a block diagram of an apparatus 3000 for transmitting information shown according to an example. For example, the apparatus 3000 may be a mobile phone, a computer, a digital broadcast terminal, a messaging device, a game console, a tablet device, a medical device, a fitness facility, a personal digital assistant, etc.

Referring to FIG. 7, the apparatus 3000 may include one or more components as follows: a processing component 3002, a memory 3004, a power component 3006, a multimedia component 3008, an audio component 3010, an input/output (I/O) interface 3012, a sensor component 3014 and a communication component 3016.

The processing component 3002 generally controls whole operation of the apparatus 3000, such as operations related to display, phone call, data communication, camera operation and recording operation. The processing component 3002 may include one or more processors 3020 for executing the instructions so as to complete all or part of steps of the above method applicable to user equipment of wireless communication or a network side of wireless communication. Besides, the processing component 3002 may include one or more modules to facilitate interaction between the processing component 3002 and the other components. For example, the processing component 3002 may include a multimedia module so as to facilitate interaction between the multimedia component 3008 and the processing component 3002.

The memory 3004 is configured to store various data so as to support operations on the apparatus 3000. Examples of these data include instructions of any application program or method for operation on the apparatus 3000, contact person data, telephone directory data, messages, pictures, videos and the like. The memory 3004 may be realized by any type of volatile or non-volatile storage device or their combination, such as a Static Random Access Memory (SRAM), an Electrically Erasable Programmable Read-only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disc.

The power component 3006 provides power for the various components of the apparatus 3000. The power component 3006 may include a power management system, one or more power sources, and other components related to power generation, management and distribution for the apparatus 3000.

The multimedia component 3008 includes a screen which provides an output interface between the apparatus 3000 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensor may not only sense a boundary of a touching or swiping action, but also detect duration and pressure related to touching or swiping operation. In some examples, the multimedia component 3008 includes a front camera and/or a back camera. When the apparatus 3000 is in an operation mode, such as a shooting mode or a video mode, the front camera and/or the back camera may receive external multimedia data. Each front camera and each back camera may be a fixed optical lens system or have a focal length and an optical zoom capability.

The audio component 3010 is configured to output and/or input an audio signal. For example, the audio component 3010 includes a microphone (MIC). When the apparatus 3000 is in the operation mode, such as a call mode, a recording mode and a voice recognition mode, the microphone is configured to receive an external audio signal. The received audio signal may be further stored in the memory 3004 or transmitted via the communication component 3016. In some examples, the audio component 3010 further includes a speaker for outputting the audio signal.

The I/O interface 3012 provides an interface between the processing component 3002 and a peripheral interface module, and the peripheral interface module may be a keyboard, a click wheel, buttons and the like. These buttons may include but are not limited to: a home button, a volume button, a start button and a lock button.

The sensor component 3014 includes one or more sensors, configured to provide state evaluation of various aspects for the apparatus 3000. For example, the sensor component 3014 may detect a start/shut-down state of the apparatus 3000 and relative positioning of the components, for example, the components are a display and a keypad of the apparatus 3000. The sensor component 3014 may further detect a position change of the apparatus 3000 or component of the apparatus 3000, whether there is contact between the user and the apparatus 3000, and an azimuth or speeding-up/speeding-down and temperature changes of the apparatus 3000. The sensor component 3014 may include a proximity sensor, configured to detect existence of a nearby object without any physical contact. The sensor component 3014 may further include an optical sensor, such as a CMOS or CCD image sensor, for use in imaging application. In some examples, the sensor component 3014 may further include an acceleration sensor, a gyroscope sensor, a magnetic sensor, a pressure sensor or a temperature sensor.

The communication component 3016 is configured to facilitate wired or wireless communication between the apparatus 3000 and the other devices. The apparatus 3000 may be accessed to a wireless network based on a communication standard, such as Wi-Fi, 2G or 3G, or their combination. In an example, the communication component 3016 receives a broadcast signal or broadcast related information from an external broadcast management system via a broadcast channel. In an example, the communication component 3016 further includes a Near-field Communication (NFC) module so as to facilitate short-range communication. For example, the NFC module may be realized based on a Radio Frequency Identification (RFID) technology, an Infra-red Data Association (IrDA) technology, an Ultra Wide Band (UWB) technology, a Bluetooth (BT) technology and other technologies.

In an example, the apparatus 3000 may be realized by one or more than one Application Specific Integrated Circuit (ASIC), Digital Signal Processor (DSP), Digital Signal Processing Device (DSPD), Programmable Logic Device (PLD), Field-Programmable Gate Array (FPGA), controller, microcontroller, microprocessor, or other electronic elements for executing the above method applicable to user equipment of wireless communication or a network side of wireless communication.

In an example, a non-transitory computer readable storage medium including instructions is further provided, such as the memory 3004 including the instructions. The instructions may be executed by a processor 3020 of an apparatus 3000 so as to complete the above method applicable to user equipment of wireless communication or a network side of wireless communication. For example, the non-transitory computer readable storage medium may be an ROM, a random access memory (RAM), a CD-ROM, a magnetic tape, a floppy disk, an optical data storage device and the like.

Those skilled in the art will easily figure out other implementation solutions of the examples of the present disclosure after considering the specification and practicing the disclosure disclosed herein. The present application intends to cover any transformation, application, or adaptive change of the examples of the present disclosure which conforms to a general principle of the examples of the present disclosure and includes common general knowledge or conventional technical means in the technical field which are not disclosed by the examples of the present disclosure. The specification and the examples are only regarded as illustrative, the true scope and spirit of the examples of the present disclosure are indicated by the following claims.

It should be understood that the examples of the present disclosure are not limited to an accurate structure described above and shown in the drawings, and various modifications and changes may be made without departing from its scope. The scope of the examples of the present disclosure is limited only by appended claims.

The invention claimed is:

1. A method for information transmission, the method comprising:
   performing, by a user equipment (UE), a compliance check on cell configuration of a target cell comprised in a conditional handover command, wherein the compliance check is performed by comparing a user equipment configuration of the UE with the cell configuration;
   when the compliance check on the cell configuration fails, at least recording a cell identifier of the target cell; and
   reporting, by the UE, failure record information comprising the cell identifier;
   wherein the compliance check includes:
      evaluating whether the cell configuration includes a particular user equipment configuration that the UE does not include based on a data wireless bearer configuration, and
      determining a failure of the compliance check when the UE does not include the particular user equipment configuration.

2. The method according to claim 1, wherein
   the failure record information further comprises: a failure identifier, wherein the failure identifier indicates the compliance check on the cell configuration of the target cell failing.

3. The method according to claim 1, wherein the method further comprises:
   performing, by the UE, Radio Resource Control (RRC) connection reestablishment; and
   reporting, by the UE, the failure record information comprising the cell identifier comprises:
   reporting, by the UE, the failure record information to a core network through a base station after finishing RRC connection reestablishment.

4. A method for information reception, the method comprising:
   receiving, by a network side of wireless communication, failure record information reported by a user equipment (UE); and
   determining, by the network side, a target cell to which a record content in the failure record information belongs according to a cell identifier comprised in the failure record information, wherein
   the failure record information is recorded when the UE performs a compliance check on cell configuration comprised in a conditional handover command and the compliance check on the cell configuration fails, wherein the compliance check is performed by comparing a user equipment configuration of the UE with the cell configuration,
   wherein the compliance check includes:
      evaluating whether the cell configuration includes a particular user equipment configuration that the UE does not include based on a data wireless bearer configuration, and
      determining a failure of the compliance check when the UE does not include the particular user equipment configuration.

5. The method according to claim 4, further comprising:
   determining, by the network side, a failure of the compliance check on the cell configuration of the target cell according to a failure identifier comprised in the failure record information.

6. The method according to claim 4, further comprising:
   deleting, by the network side, the cell configuration which fails the compliance check from the target cell.

7. The method according to claim 4, wherein receiving the failure record information reported by the UE comprises:
   receiving, by the network side, the failure record information reported by the UE through radio resource control (RRC) connection.

8. A communication device, comprising:
   a processor,
   a memory that stores an executable program,
   wherein the executable program when executed by the processor cause the communication device to:
   perform a compliance check on cell configuration of a target cell comprised in a conditional handover command, wherein the compliance check is performed by comparing a user equipment configuration of a User Equipment (UE) with the cell configuration;
   when the compliance check on the cell configuration fails, at least record a cell identifier of the target cell; and report failure record information comprising the cell identifier;
wherein the compliance check includes:
evaluating whether the cell configuration includes a particular user equipment configuration that the UE does not include based on a data wireless bearer configuration, and
determining a failure of the compliance check when the UE does not include the particular user equipment configuration.

9. The communication device according to claim 8, wherein
the failure record information further comprises: a failure identifier, wherein the failure identifier indicates the compliance check on the cell configuration of the target cell failing.

10. The communication device according to claim 8, wherein the processor is further configured to:
perform Radio Resource Control (RRC) connection reestablishment; and
report the failure record information to a core network through a base station after finishing RRC connection reestablishment.

11. A communication device, comprising:
a processor,
a memory that stores an executable program,
wherein the executable program when executed by the processor cause the communication device to perform the method according to claim 4.

12. The communication device according to claim 11, wherein the method further comprises:
determining a failure of the compliance check on the cell configuration of the target cell according to a failure identifier comprised in the failure record information.

13. The communication device according to claim 11, wherein the method further comprises:
deleting the cell configuration which fails in the compliance check from the target cell.

14. The communication device according to claim 11, wherein the method further comprises:
receiving the failure record information reported by the UE through radio resource control (RRC) connection.

15. A non-transitory computer-readable storage medium comprising instructions which, when executed by a processor in a user equipment (UE), cause the processor to perform the method of claim 1.

16. A non-transitory computer-readable storage medium comprising instructions which, when executed by a processor in the network side, cause the processor to perform the method of claim 4.

* * * * *